Dec. 29, 1936.  T. G. SCHMEISER  2,066,078
AUTOMOBILE DRESSING TENT
Filed July 11, 1936  2 Sheets-Sheet 1
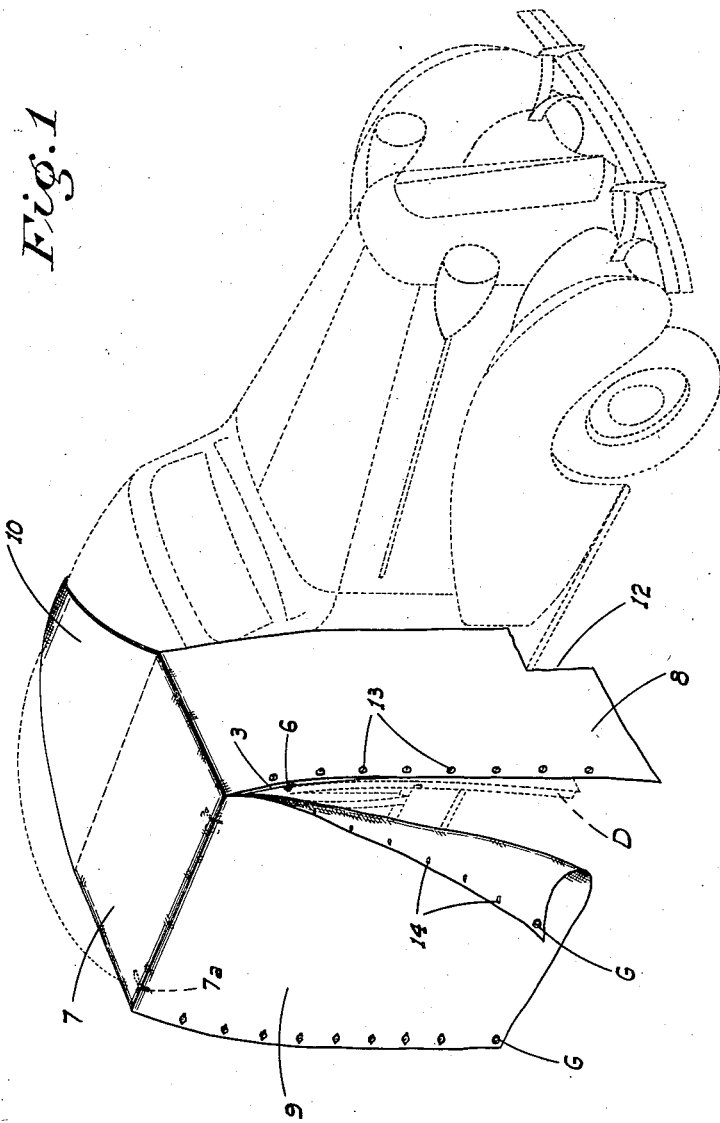
INVENTOR
*T. G. Schmeiser*
BY
ATTORNEY Dec. 29, 1936. T. G. SCHMEISER 2,066,078
AUTOMOBILE DRESSING TENT
Filed July 11, 1936 2 Sheets-Sheet 2
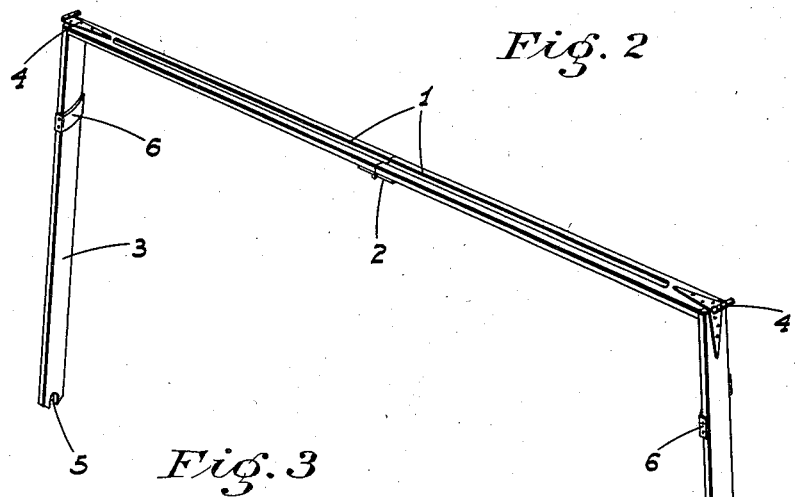
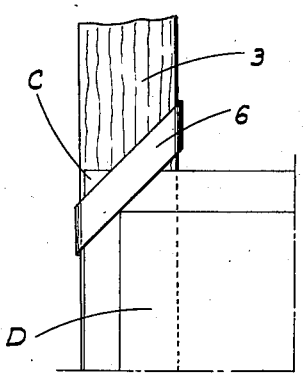
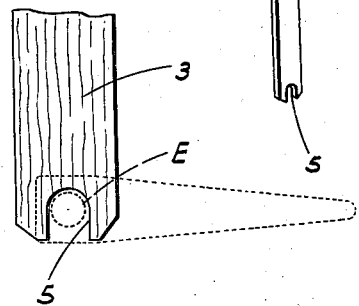
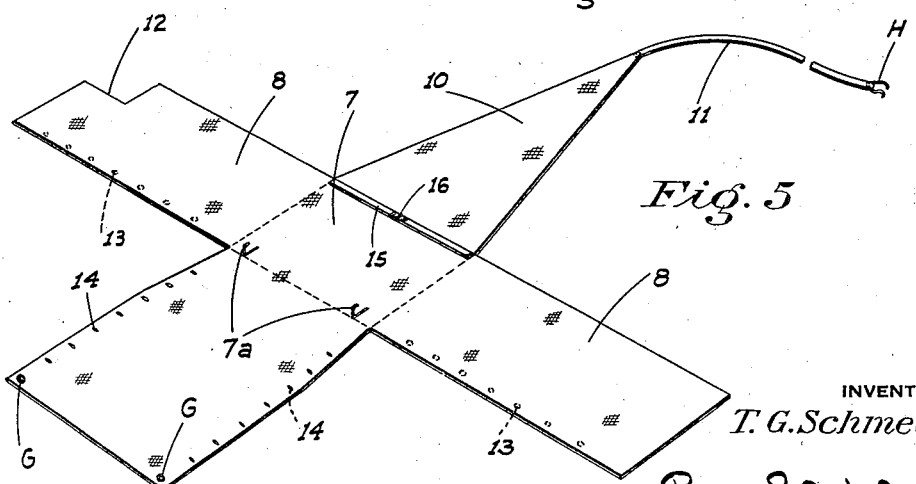
INVENTOR
T. G. Schmeiser
ATTORNEY Patented Dec. 29, 1936

2,066,078

UNITED STATES PATENT OFFICE 2,066,078

AUTOMOBILE DRESSING TENT

Theodore G. Schmeiser, Fresno, Calif.

Application July 11, 1936, Serial No. 90,136

6 Claims. (Cl. 135—5)

This invention relates generally to an automobile dressing tent and is directed particularly to a dressing tent adapted to be set up in connection with an automobile of the four door type when the doors on one side thereof are open.

Dressing tents of this character have heretofore required rather complicated and bulky frames upon which the tent covering was supported. For this reason this type of tent has not been used to any great extent.

It is therefore the principal object of my invention to provide an automobile dressing tent which comprises a simple frame structure and which may be readily and quickly set up in connection with an automobile of the four door type when the doors on one side thereof are open.

Another object of my invention is to provide an automobile dressing tent having a collapsible frame which when rolled with the tent covering will form a relatively small and light bundle. Thus when dismantled the device can be carried in an automobile and occupy very little space.

A further and important object is to provide a tent of the above type which will give full head or standing room, even when mounted on modern relatively low cars.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a perspective view of my improved tent mounted on an automobile.

Figure 2 is a perspective view of the frame structure as erected.

Figure 3 is an enlarged fragmentary view of one of the frame posts illustrating the door engaging strap.

Figure 4 is an enlarged fragmentary view of the lower end of one of the frame posts as engaging the hub of a door handle.

Figure 5 is a perspective view of the tent covering in an outstretched position and looking at the inner or under side.

Referring now more particularly to the characters of reference on the drawings, my improved automobile tent comprises a portable frame, as shown in Fig. 2, which includes a sectional top bar 1 hinged in the center as at 2 for downward folding movement at its ends. The top bar is provided at each end with laterally resilient frame posts 3 hinged at their upper ends as at 4 to the outer ends of the top bar 1 for folding movement.

The lower ends of the frame posts 3 are formed with notches 5 adapted to engage or straddle the hubs E of the automobile door handles in the manner shown in Fig. 4. Angularly disposed securing straps 6 are attached at each end to the frame posts adjacent to the upper portion thereof; said straps extending diagonally across the inner faces of the posts and being arranged to engage over the upper and outer corners C of the automobile doors D when the lower ends of the frame posts rest on the door handle hubs. The sectional top bar 1 is constructed of relatively non-flexible material while the frame posts 3 are relatively resilient in order that they may bend to conform to the curvature of the automobile doors.

To mount the frame in position for use, it is only necessary to open the front and rear doors on one side of the automobile; unfold the frame to its erected position as shown in Fig. 2, and then engage the notches 5 over the door handle hubs and the straps 6 over the upper and outer corners of the doors. Of course, my device is only capable of use on automobiles of the four door type in which the front and rear doors open in opposite directions.

The tent covering shown outstretched in Fig. 5 comprises a top panel 7 having hooks 7a secured along its forward edge on the underside, side panels 8, a front panel 9, and a tie panel 10 which tapers to a point at its outer end. A tie strap 11 is secured to the outer end of the tie panel and is provided with hooks H on its outer end.

The tent covering when in use is disposed with the top panel extending from the top bar 1 to the roof of the automobile and the hooks 7a engaged with said bar; the side panels depending over the faces of the doors, and the front panel depending from the top bar and forming a closure for the opening between the outer edges of the doors. The panels 8 and 9 are of sufficient length to approximately reach to the ground level and are cut to conform to the door curvature. The side panels 8 may if desired be cut out as at 12 in order to clear the running board of the automobile. The tie panel 10 extends across the roof of the car and maintains the top panel 7 taut and in place; the tie strap 11 also being drawn taut and the hooks H engaged with the edge of the running board on the opposite side of the automobile.

When the tent is erected, the adjacent edges of the side panels and front panel may be secured together by means of buttons and button holes indicated at 13 and 14 respectively. If desired a "zipper" may be used instead of the buttons. Also, the front panel 9 may be provided with grommets G so that said panel can be supported in outstretched position on supporting poles to form an awning.

When erected the tent affords a convenient and private enclosure for dressing or other purposes; access to the interior of the automobile being provided through the open doors. Thus my improved tent is well suited for use at beaches, on camping trips and the like.

For transporting the device, the frame structure is folded up and the tent covering wrapped about the same forming a neat and compact bundle. Such bundle is preferably formed by laying the tent cover in the outstretched position shown in Fig. 5; folding panels 8 and 9 over panel 7; placing the folded frame over top panel 7 and then rolling the folded panels and frame so that panel 10 is wound about the resultant bundle. Tie strap 11 is then used to secure the bundle against unfolding or unrolling.

It should be noted that the distance the frame posts 3 extend above the straps 6 (and the top of the car doors) is sufficient to provide full head room in the tent, considering the ground as the floor. This feature makes the tent very comfortable to use, since it is unnecessary to crouch or bend over in order to avoid the top of the tent.

To maintain the top tent panel 7 taut at the back, I may secure a spreader bar 15 along said panel as shown in Fig. 5; this bar being preferably hinged in the middle as at 16 for convenience in folding.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an automobile dressing tent adapted for use with an automobile having oppositely opening front and rear doors, a frame for removable and supporting engagement with the doors when the same are open and including a top bar, frame posts depending from the ends of the top bar and adapted to extend down the outside of the doors, said frame posts being notched at their lower ends to straddle the hubs of the door handles.

2. A device as in claim 1 in which the frame posts are resilient in order to conform to the vertical curvature of the doors.

3. A device as in claim 1 in which the vertical posts are hinged at their upper ends to the outer ends of the top bar and the top bar is sectional and with the sections hinged together for folding movement.

4. A device as in claim 1 in which the frame posts are provided with diagonally extending straps on their inner faces adjacent the top thereof for detachable engagement with the upper and outer corners of the doors.

5. A frame for a dressing tent for use on an automobile having oppositely opening front and rear doors; said frame including a top bar and means to support said bar in a substantially horizontal position from the doors adjacent their outer ends when the doors are open and at a height above the doors to provide head room under said bar.

6. An automobile dressing tent adapted for use with an automobile having oppositely opening front and rear doors, said tent comprising a frame for removable engagement with and adapted to extend between corresponding front and rear doors in the top when the same are open, a tent covering including a top panel to cover the area defined between the doors, the frame and the adjacent side of the car, means to detachably secure the front edge of the top panel to the frame, and means formed in connection with the rear edge of the top panel and adapted to extend over the roof of the automobile and to be attached to the opposite side of the automobile to maintain the top panel taut.

THEODORE G. SCHMEISER.